(12) United States Patent
Kim et al.

(10) Patent No.: US 8,420,771 B2
(45) Date of Patent: Apr. 16, 2013

(54) PH-SENSITIVE POLYETHYLENE OXIDE CO-POLYMER AND SYNTHETIC METHOD THEREOF

(76) Inventors: Jung-Ahn Kim, Seoul (KR); Hyun-Oh Yoo, Seoul (KR)

( * ) Notice: Subject to any disclaimer, the term of this patent is extended or adjusted under 35 U.S.C. 154(b) by 206 days.

(21) Appl. No.: 12/919,580

(22) PCT Filed: Feb. 26, 2009

(86) PCT No.: PCT/KR2009/000918
§ 371 (c)(1),
(2), (4) Date: Aug. 26, 2010

(87) PCT Pub. No.: WO2009/107987
PCT Pub. Date: Sep. 3, 2009

(65) Prior Publication Data
US 2010/0331514 A1  Dec. 30, 2010

(30) Foreign Application Priority Data
Feb. 26, 2008  (KR) .......... 10-2008-0017273

(51) Int. Cl.
*C08G 65/329* (2006.01)
*C08L 51/00* (2006.01)
*C08L 53/00* (2006.01)
*C08L 71/02* (2006.01)

(52) U.S. Cl.
USPC .......... 528/310; 528/313; 528/314; 528/315; 528/321; 528/322; 528/323; 528/327

(58) Field of Classification Search .......... None
See application file for complete search history.

(56) References Cited

U.S. PATENT DOCUMENTS

| | | | |
|---|---|---|---|
| 5,548,035 A | 8/1996 | Kim et al. | |
| 5,612,396 A | 3/1997 | Valenti et al. | |
| 6,486,260 B1 | 11/2002 | Yuasa et al. | |
| 6,616,946 B1 | 9/2003 | Meier et al. | |
| 6,762,269 B1 * | 7/2004 | Maxim et al. | 526/332 |
| 6,784,266 B2 | 8/2004 | Kim et al. | |
| 7,670,627 B2 | 3/2010 | Shefer et al. | |
| 2004/0024096 A1 | 2/2004 | Kim et al. | |
| 2006/0263812 A1 | 11/2006 | Park | |
| 2009/0142268 A1 | 6/2009 | Kim et al. | |

FOREIGN PATENT DOCUMENTS

| | | |
|---|---|---|
| JP | 06-211940 | 8/1994 |
| JP | 2000-247707 A | 9/2000 |
| JP | 2003-514650 A1 | 4/2003 |
| JP | 2005-290305 | 10/2005 |
| JP | 2006-510666 | 3/2006 |
| JP | 2009-500488 A | 1/2009 |
| KR | 10-1997-0009240 B1 | 6/1997 |

OTHER PUBLICATIONS

Y. H. Bae, in Controlled Drug Delivery: Challenges and Strategies, K. Park, ed., Am. Chem. Soc., Washington, D. C., 1997, Chap. 8, pp. 147-162.
"Polyelectrolyte Gels; Properties, Preparation, and Applications", R. S. Harland and R. K. Prud'homme, eds., ACS Symp. Series # 480, Am. Chem. Soc. Washington, D. C., 1992, Chap. 17, p. 285.
J. Kim, et. al. Macromolecular Research, vol. 15, pp. 337-342, 2007.
N. Hadjichristidis, et. al. Block Copolymers: Synthetic Strategies, Physical Properties, and Applications, Wiley-Interscience, 2003.
Y.Shin-Ya et al.: "Polyelectrolyte Complex Films Derived from Polyethyleneoxide-Maleic Acid Copolymer and Chitosan: Preparation and Characterization", Macromol. Biosci., vol. 4, 2004, pp. 526-531.
K. N. Park et al.: "Modification of Cellulase by Sxnthesized copolymer with Polyethylene Oxide and Maleic Acid Anhydride", Journal of Applied Polymer Science, vol. 77, 2000, pp. 368-373.
Y. Shin-Ya et al.: "Chemical modification of chicken egg white proteins with polyethyleneoxide—maleic anhydride copolymer and their partitioning in aqueous two-phase systems", Journal of Chemical Technology and Biotechnology, vol. 80, 2005, pp. 338-344.
D.H.Go et al.: "Synthesis of New pH-Sensitive Poly(ethylene oxide-b-maleic acid) from Modification of Poly(ethylene oxide-b-N-phenylmaleimide)", Macromolecular Research, vol. 16, No. 7, 2008, pp. 659-662.
Supplementary European Search Report for EP 09 71 5802 dated Oct. 4, 2012.

* cited by examiner

*Primary Examiner* — Ana Woodward
(74) *Attorney, Agent, or Firm* — Dority & Manning, P.A.

(57) ABSTRACT

Provided are a new pH-sensitive co-polymer prepared from polyethylene oxide and a method of preparing the same. The polyethylene oxide co-polymer includes repeating units expressed by the Chemical Formulas 1 and 2, and further includes at least one of repeating units expressed by the Chemical Formulas 3 through 6.

2 Claims, No Drawings

PH-SENSITIVE POLYETHYLENE OXIDE CO-POLYMER AND SYNTHETIC METHOD THEREOF

CROSS REFERENCE TO RELATED APPLICATION

This application is the U.S. National Stage entry of International Application Number PCT/KR2009/000918 filed under the Patent Cooperation Treaty having a filing date of Feb. 26, 2009, International Publication Number WO 20091107987 A2, which claims filing benefit of Korean Patent Application Serial Number 10-2008-0017273 having a filing date of Feb. 26, 2008.

TECHNICAL FIELD

The present invention relates to a pH-sensitive polyethylene oxide co-polymer and a synthetic method thereof, and more particularly, to a pH-sensitive polyethylene oxide co-polymer which is sensitive to pH changes in a human body or in a cancer cell and can be used as a polymeric material for a drug delivery, and a synthetic method of the pH-sensitive polyethylene oxide co-polymer.

BACKGROUND ART

Recently, an intelligent drug delivery system, which can reduce a side effect caused by drug abuse and maximize drug effect by allowing drug to have selective effect on a specific area, is drawing attention.

As an example of such an intelligent drug delivery system, various methods of using a stimuli-sensitive material to external stimulus such as pH and temperature have been proposed, and various stimuli-sensitive materials are disclosed in the related art references (Y. H. Bae, in Controlled Drug Delivery: Challenges and Strategies, K. Park, ed., Am. Chem. Soc., Washington, D.C., 1997, Chap. 8, 147-162 page).

Among these materials, polyelectrolyte obtained by a polymerization of vinyl monomer having poly (N-isopropyl acryl amide) sensitive to temperature, and carboxyl, sulfone, amine, or ammonium sensitive to pH has been used as a material for intelligent drug delivery ("Polyelectrolyte Gels; Properties, Preparation, and Applications", R. S. Harland and R. K. Prud'homme, eds., ACS Symp. Series #480, Am. Chem. Soc. Washington, D.C., 1992, Chap. 17, page 285). A co-polymer grafted with temperature-sensitive and ph-sensitive enzymes is known as a dual sensitive intelligent polymer material.

A limitation in preparing such a related art material for intelligent drug delivery is that it is difficult to regulate the molecular weight and components of the material to control the drug delivery effect. In order to solve the limitation, U.S. Pat. No. 6,784,266 discloses a method of preparing a dual sensitive smart hydrogel by preparing sulfon amide vinyl monomer sensitive to pH and synthesizing a poly (N-isopropyl acryl amide), which is a material sensitive to temperature, using the atom transfer radical polymerization.

Besides, in order to minimize a side effect and maximize a drug delivery effect, various attempts have been globally conducted to develop a new stimuli-sensitive drug delivery material.

DISCLOSURE OF INVENTION

Technical Problem

An aspect of the present invention provides a pH-sensitive co-polymer prepared from a polyethylene oxide which is easy to regulate the molecular weight, and can be used as a new drug delivery polymer material having pH-sensitivity, and a synthetic method of the pH-sensitive co-polymer.

Technical Solution

According to an aspect of the present invention, there is provided a polyethylene oxide co-polymer including repeating units expressed by the following Chemical Formulas 1 and 2:

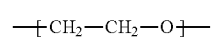

[Chemical Formula 1]

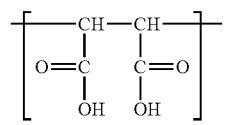

[Chemical Formula 2]

The polyethylene oxide co-polymer may further include at least one of repeating units expressed by the following Chemical Formulas 3 through 6:

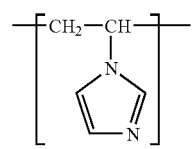

[Chemical Formula 3]

[Chemical Formula 4]

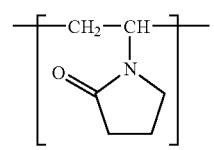

[Chemical Formula 5]

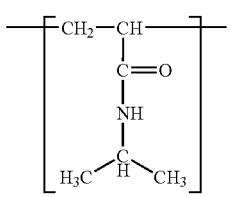

[Chemical Formula 6]

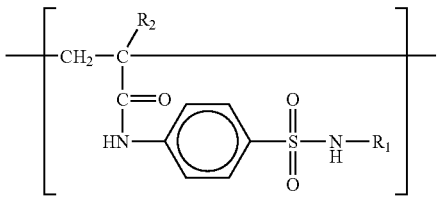

where $R_1$ is phenyl, oxazole, acetyl, methazole, dimethoxane, diazine, methoxypyridazine, methazine, isomidine, or pyridine, and $R_2$ is hydrogen or methyl.

The polyethylene oxide co-polymer may be a compound including at least one of repeating units expressed by the following Chemical Formulas 7 through 16:

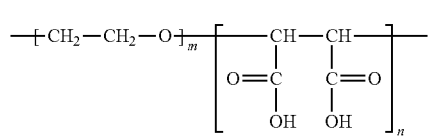
[Chemical Formula 7]
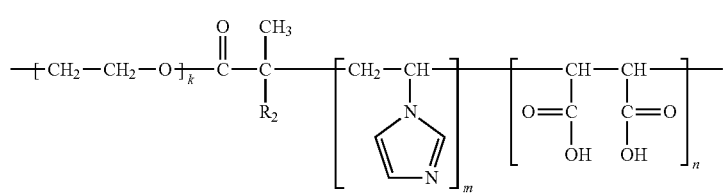
[Chemical Formula 8]
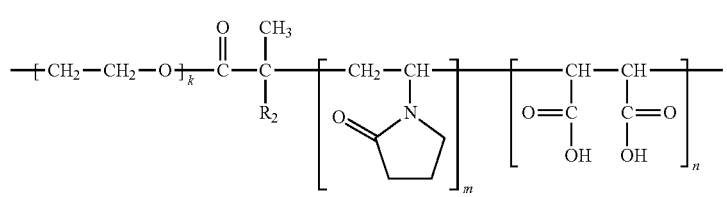
[Chemical Formula 9]
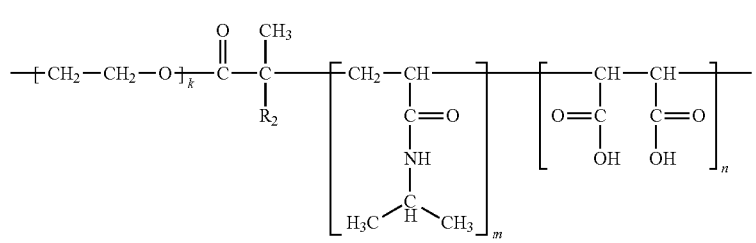
[Chemical Formula 10]
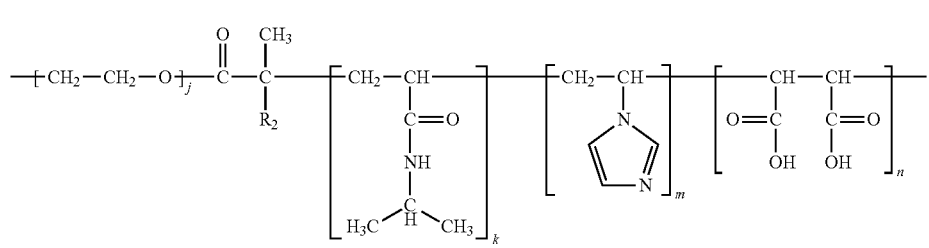
[Chemical Formula 11]
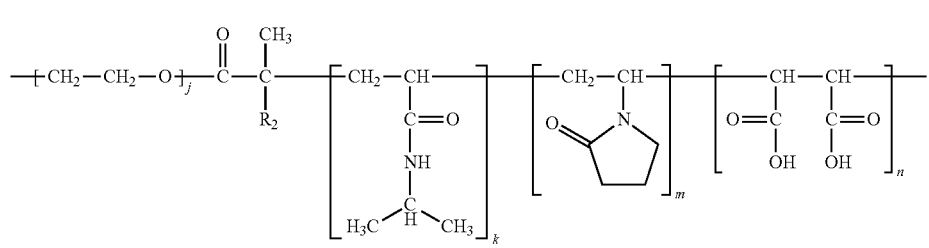
[Chemical Formula 12]
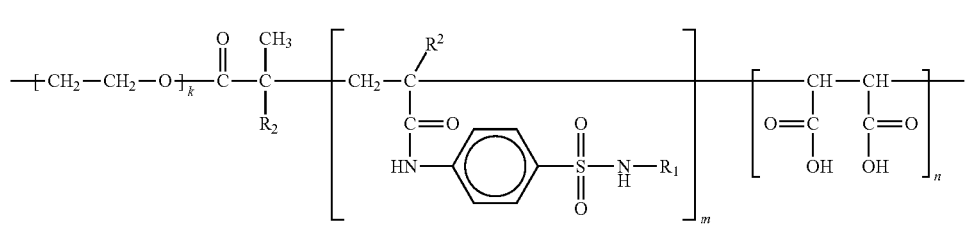
[Chemical Formula 13]

-continued

[Chemical Formula 14]

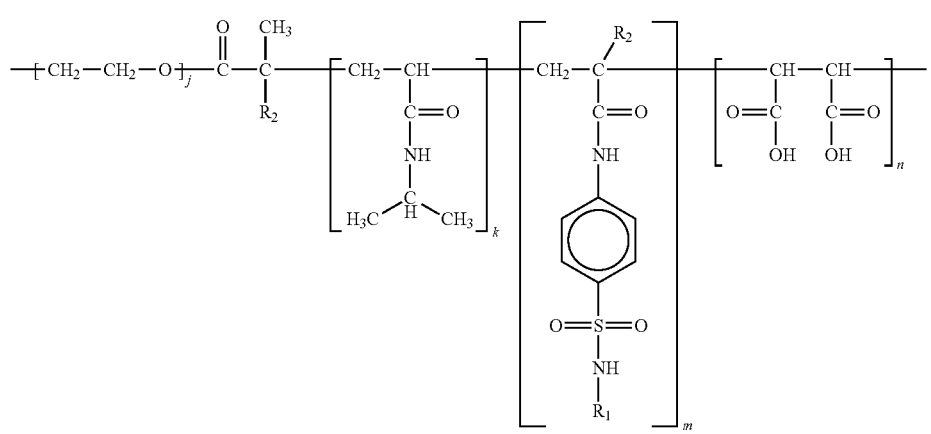

[Chemical Formula 15]

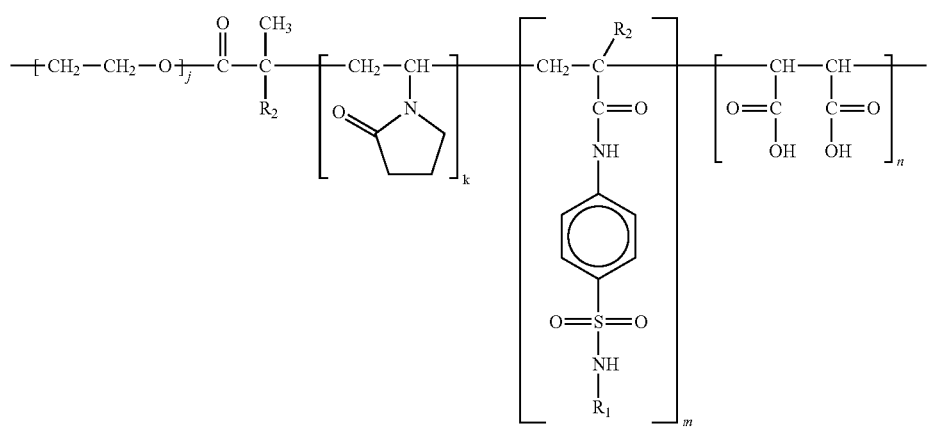

[Chemical Formula 16]

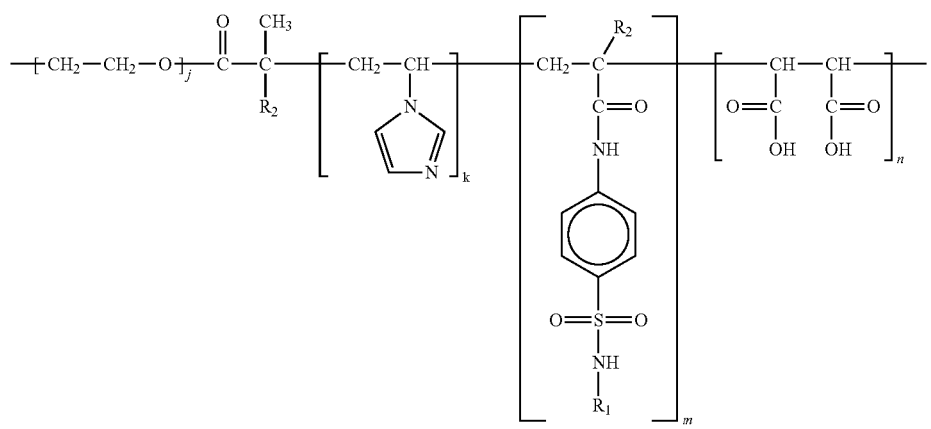

where $R_1$ is phenyl, oxazole, acetyl, methazole, dimethoxane, diazine, methoxypyridazine, methazine, isomidine, or pyridine, $R_2$ is hydrogen or methyl, m is an integer of from 5 to 500, preferably, from 5 to 300, n is an integer of from 3 to 500, preferably from 5 to 200, and j and k are integers of from 20 to 500, preferably, 50 to 300.

According to other aspect of the present invention, there is provided a drug delivery system comprising the polyethylene oxide co-polymer according to the present invention.

According to another aspect of the present invention, there is provided a method of preparing a polyethylene oxide co-polymer, the method comprising living-polymerizing an ethylene oxide monomer using a mixed alkali-metal alkoxide as an initiator to prepare a polyethylene oxide; co-polymerizing the polyethylene oxide and a monomer expressed by the following Chemical Formula 17; and carboxylating an imide block using a hydrated hydrazine,

[Chemical Formula 17]

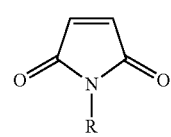

where R is selected from the group consisting of methyl, cyclohexyl, phenyl, tert-butyl, and R-αmethylbenzyl.

According to still another aspect of the present invention, there is provided a method of preparing a polyethylene oxide co-polymer, the method comprising living-polymerizing an ethylene oxide monomer using a mixed alkali-metal alkoxide as an initiator to prepare a polyethylene oxide; preparing a polyethylene oxide reversible addition fragmentation chain transfer (RAFT) material through macro-initiating the polyethylene oxide; co-polymerizing at least one monomer selected from the group consisting of sulfon amide acryl monomer, N-phenylmaleimide, N-vinylpyrrolidone, 1-vinylimidazole and isopropyl acryl amide with the RAFT material; and carboxylating an imide block using a hydrated hydrazine.

Advantageous Effects

According to the present invention, it is possible to prepare new maleic acid or fumaric acid co-polymer having the pH-sensitivity, which can be used in a drug delivery system.

Also, by using a method according to the present invention, it is possible to regulate the molecular weight of bioavailable polyethylene oxide and the molecular weight of maleimide polymer as a maleic acid polymer. Accordingly, it is possible to control the properties of the pH-responsible block co-polymer by regulating the molecular weight thereof, and, if necessary, to change its composition according the pH-change.

Furthermore, according to the present invention, a co-polymer having various compositions can be prepared using a control/living polymerization such as a reversible addition-fragmentation chain transfer, and thus the composition of the co-polymer can be varied. Thus, a co-polymer having desired properties can be achieved.

Moreover, co-polymers according to the present invention can be used to fill or capsulate drugs in an aqueous solution at a room temperature, and be used as an intelligent drug delivery polymer material having pH-sensitivity.

BEST MODE FOR CARRYING OUT THE INVENTION

According to an aspect of the present invention, there is provided a polyethylene oxide co-polymer including repeating units expressed by the following Chemical Formulas 1 and 2:

[Chemical Formula 1]

$$-\!\!-\!\!\!+\!\!CH_2-\!CH_2-\!O\!\!\!+\!\!-\!\!-$$

[Chemical Formula 2]

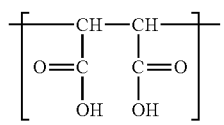

The polyethylene oxide co-polymer may further include at least one of repeating units expressed by the following Chemical Formulas 3 through 6:

[Chemical Formula 3]

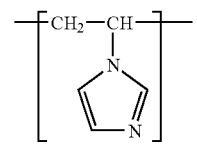

[Chemical Formula 4]

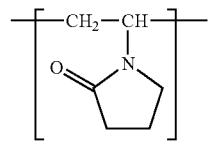

[Chemical Formula 5]

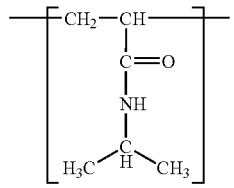

[Chemical Formula 6]

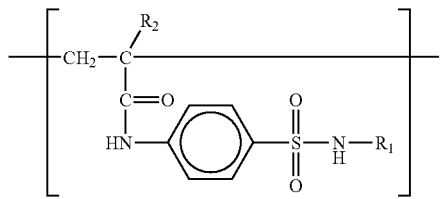

where $R_1$ is phenyl, oxazole, acetyl, methazole, dimethoxane, diazine, methoxypyridazine, methazine, isomidine, or pyridine, and $R_2$ is hydrogen or methyl.

The polyethylene oxide co-polymer may be a compound including at least one of repeating units expressed by the following Chemical Formulas 7 through 16:

[Chemical Formula 7]

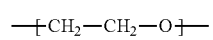

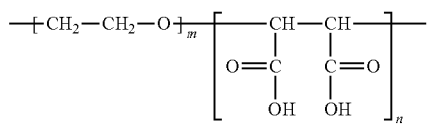

[Chemical Formula 8]

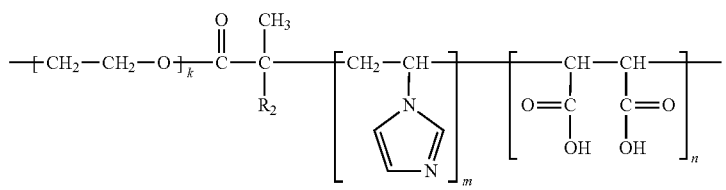

-continued
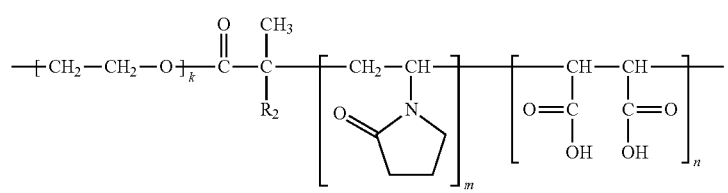
[Chemical Formula 9]
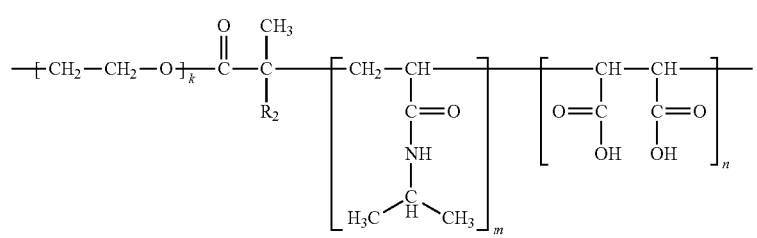
[Chemical Formula 10]
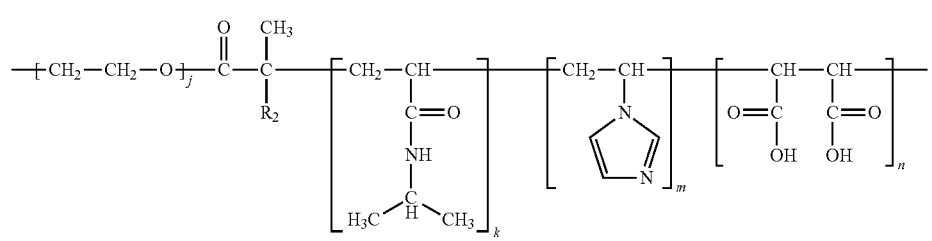
[Chemical Formula 11]
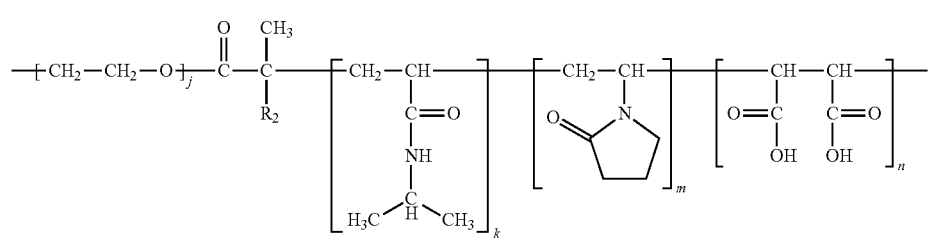
[Chemical Formula 12]
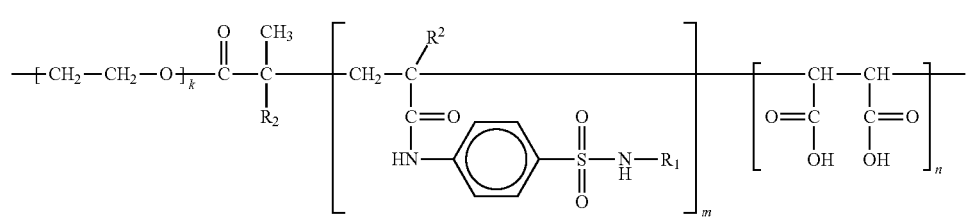
[Chemical Formula 13]
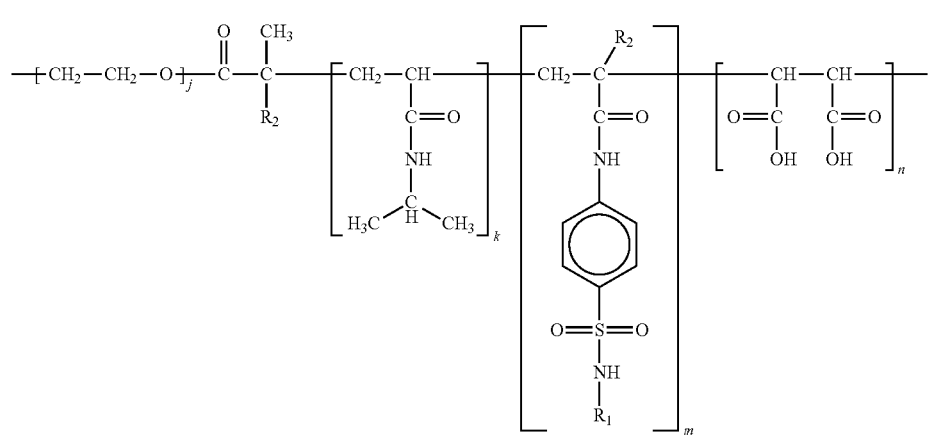
[Chemical Formula 14]

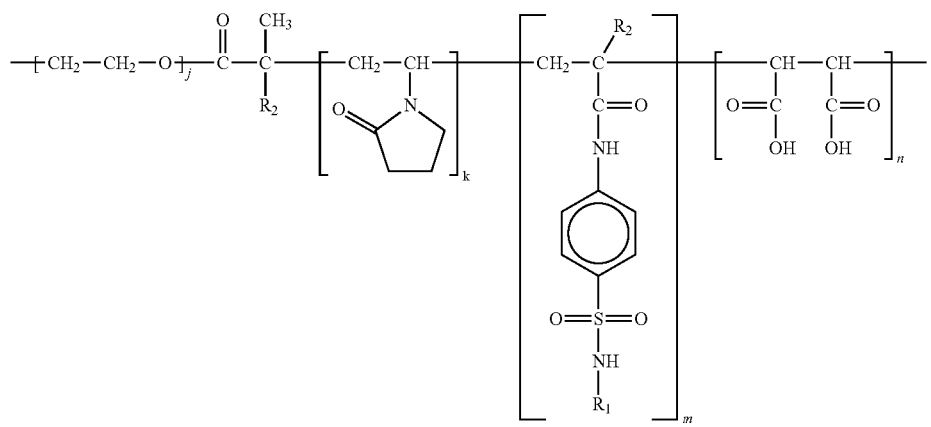

[Chemical Formula 15]

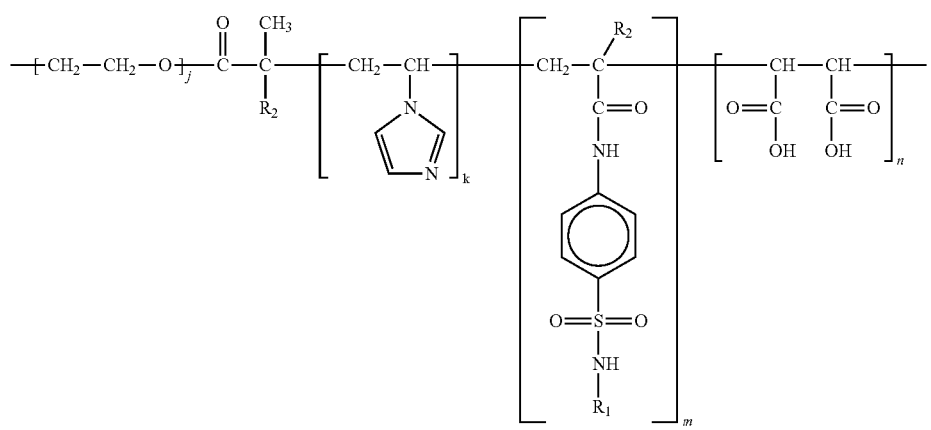

[Chemical Formula 16]

where $R_1$ is phenyl, oxazole, acetyl, methazole, dimethoxane, diazine, methoxypyridazine, methazine, isomidine, or pyridine, $R_2$ is hydrogen or methyl, m is an integer of from 5 to 500, preferably, from 5 to 300, n is an integer of from 3 to 500, preferably from 5 to 200, and j and k are integers of from 20 to 500, preferably, 50 to 300.

The co-polymer having the above configuration according to the present invention includes a carboxyl, thereby having the pH-sensitivity. Also, the co-polymer according to the present invention may have pH-sensitivity in a desired range of by regulating added amount of repeating units upon preparation.

Hereinafter, a method of preparing polyethylene oxide co-polymer according to the present invention will be described.

Preparation Method

A polyethylene oxide co-polymer according to the present invention may be prepared using an anion living polymerizing method or a reversible addition fragmentation chain transfer (RAFT) radical polymerization.

(1) Preparation by the anion living polymerization

A method of preparing a polyethylene oxide co-polymer may include: living-polymerizing an ethylene oxide monomer using a mixed alkali-metal alkoxide as an initiator to prepare a polyethylene oxide; polymerizing the polyethylene oxide and a monomer expressed by the following Chemical Formula 17; and carboxylating an imide block using a hydrated hydrazine,

[Chemical Formula 17]

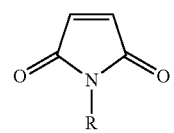

where R is selected from the group consisting of methyl, cyclohexyl, phenyl, tert-butyl, and R-α-methylbenzyl.

When a polyethylene oxide is prepared using the living polymerization as described above, there is an advantage capable of regulating the molecular weight of the polyethylene oxide.

A method of preparing a polyethylene oxide by the living polymerization and a method of regulating the molecular weight are clearly disclosed in the reference (J. Kim, et. Al. Macromolecular Research, Vol. 15, pages 337-342, 2007). Accordingly, those skilled in the art could prepare the polyethylene oxide with reference to the related art technology and description of the present invention without undue difficulties.

If the polyethylene oxide is prepared, a polyethylene oxide co-polymer is prepared by adding and polymerizing the compound expressed by the Chemical Formula 17.

Various block co-polymer preparing methods and a block co-polymer preparing method as a conversion polymerization method mixed with various polymerization preparing methods are well known in the art, and fully described in the following related art references. Accordingly, those skilled in the art could prepare the polyethylene oxide co-polymer with reference to the related art technology and description of the present invention without undue difficulties.

RELATED ART REFERENCES

1. N. Hadjichristidis, et. al. Block Copolymers: Synthetic Strategies, Physical Properties, and Applications, Wiley-Interscience, 2003.
2. Jung-ahn, Kim, et. al. Korean Patent No. 122,055 (1997).

When the co-polymerization of the polyethylene oxide and the monomer expressed by Chemical Formula 17 is completed, a hydrated hydrazine and NaOH are added to carboxylate the imide block of the Chemical Formula 17, thereby preparing the polyethylene oxide co-polymer.

(2) Preparation by the Raft Radical Polymerization Method

In addition to the above-described method, an RAFT material is prepared through macro-initiating a polyethylene oxide, and then the polyethylene oxide co-polymer may be prepared through a RAFT radical polymerization using the RAFT material. In this case, there is an advantage in that a co-polymer having more various compositions may be prepared.

More specifically, a method of preparing a polyethylene oxide co-polymer may include: living-polymerizing an ethylene oxide monomer using a mixed alkali-metal alkoxide as an initiator to prepare a polyethylene oxide; preparing an RAFT material through macro-initiating the polyethylene oxide; co-polymerizing at least one monomer selected from the group consisting of sulfon amide acryl monomer, N-phenylmaleimide, N-vinylpyrrolidone, 1-vinylimidazole and isopropyl acryl amide with the RAFT material; and carboxylating an imide block by adding a hydrated hydrazine to the prepared co-polymer.

In this case, the preparing process of the polyethylene oxide, as described above, may be performed using the related art technology well known in the art.

The macro-initiating of the polyethylene oxide may be performed through a reaction after an addition of a macro initiator fragmentation material such as xanthogenate together with a radical initiator such as benzol peroxide or azobisacrylonitrile. Through the reaction, the macro initiator fragmentation material is combined with a chain end of the polyethylene oxide, to thereby synthesize the poly ethylene oxide reversible addition fragmentation chain transfer material.

After the synthesis of the RAFT material is completed, at least one monomer selected from the group consisting of sulfon amide acryl monomer, N-phenylmaleimide, N-vinylpyrrolidone, 1-vinylimidazole and isopropyl acryl amide is added. Then, the co-polymer is synthesized through the polymerization reaction. In this case, a temperature for preparing the co-polymer may range from −78° C. to 150° C., preferably, 0° C. to 100° C.

Next, by carboxylating the imide block after adding the hydrated hydrazine and NaOH, the polyethylene oxide co-polymer according to the present invention can be prepared.

As described above, when using the RAFT radical polymerization method, a co-polymer having more various compositions may be prepared, and also a dual stimuli-sensitive co-polymer having the temperature-sensitivity and pH-sensitivity may be prepared through the co-polymerization of the isopropyl acryl amide monomer. Moreover, properties of the co-polymer may be controlled through a change of the composition thereof.

When using a drug delivery polymer material including the co-polymer prepared by the method according to the present invention, it is possible to fill or capsulate drugs in an aqueous solution at a room temperature.

According to the present invention, toluene, benzene, tetrahydrofuran, dimethylformamide, dimethylsulfoxide, ethanol, methanol, isopropyl alcohol, and distilled water may be used as a solvent. Also, there is an advantage in that alkali-metal catalyst can be easily removed according to the solvent.

MODE FOR THE INVENTION

Exemplary embodiments of the present invention will now be described in detail with reference to the accompanying drawings.

Embodiment 1

A polyethylene oxide was prepared through polymerizing an ethylene oxide purified under a high vacuum using a commercial butyllithium (normal-butyl, secondary-butyl, tertiary butyl) anionic initiator and a potassium tertiary-butoxide, in benzene/dimethyl sulfoxide (70/30, vol/vol) mixed solvent for about 48 hours at a temperature of 25° C. to 45° C. In this case, in order to control the molecular weight of the polyethylene oxide, ratio of ethylene oxide monomer and butyllithium/potassium tertiary-butoxide was regulated, and a ratio of solid volume to solvent was controlled to be less than 15%. The molecular weight of the polyethylene oxide synthesized through the living polymerization was controlled to be 3,000 g/mol to 20,000 g/mol when measured using a gel chromatography.

Embodiment 2

Under the same conditions as those in Embodiment 1, a polyethylene oxide having a molecular weight of 5,000 g/mol was prepared, and a polyethylene oxide macro initiator having a bromo group at an end thereof was prepared by adding 2-bromopropionyl bromide at a concentration ten times greater than that of a prepared alkoxide chain end. All reactions were processed under a high vacuum. The yield of the prepared macro initiator was more than 92 mol % according to the nuclear magnetic resonance analysis, and a coupled material of 8 wt % was produced according to a gel chromatography result.

Embodiment 3

Under the same conditions as those in Embodiment 1, a polyethylene oxide having a molecular weight of 5,000 g/mol was prepared, and a polyethylene oxide macro initiator having a bromo group at an end thereof was prepared by adding 2-bromoisobutyryl bromide at a concentration ten times greater than that of a prepared alkoxide chain end. All reactions were processed under a high vacuum. The yield of the prepared macro initiator was more than 95 mol % according to the nuclear magnetic resonance analysis, and a coupled material of 5% was produced according to a gel chromatography result.

Embodiment 4

A living polyethylene oxide ($M_n$=5,000 g/mol) solution prepared under the same reaction conditions as those in Embodiment 1 was put in a 500 mL round flask reactor, and N-phenylmaleimide (2 mg) (FW=223) dissolved in an ampoule containing tetrahydrofuran (20 mL) is added in the round flask reactor. The reaction was processed at 25° C. during 24 hours, and then terminated by adding gasless methanol (5 mL). The reaction product was precipitated and analyzed in excessive dimethyl ether. The molecular weight of the prepared polyethylene oxide-b-poly (N-phenylmaleimide) was 6,500 g/mol according to the nuclear magnetic resonance spectral analysis.

Embodiment 5

The polyethylene oxide-t-poly (N-phenylmaleimide) (2 g, $3.0 \times 10^{-4}$ mol) prepared in Embodiment 4 was put in 100 mL round flask, where dimethyl sulfoxide (40 mL) was additionally dissolved and hydrazine ($H_2N$-$NH_2 \cdot H_2O$) was added. The reaction is processed at a room temperature during 18 hours, and then polyethylene oxide-t-poly (maleic acid) was synthesized. The molecular weight of the prepared block co-polymer was 5,700 g/mol according to the nuclear magnetic resonance spectral analysis.

Embodiment 6

The polyethylene oxide macro initiator (2 g, $M_n$=5,100 g/mol) prepared in Embodiment 2 was put in a 500 mL round flask reactor. Then, after tetrahydrofuran (100 mL) was poured into and thoroughly dissolved under nitrogen atmosphere, potassium ethyl xanthogenate (96%, 0.3 g) dissolved in tetrahydrofuran (30 mL) was poured into the reactor. The reaction was processed at 45° C. in a nitrogen atmosphere during 24 hours, to thereby synthesize a reversible addition fragmentation chain transfer (RAFT) material ($M_n$=5,200 g/mol) having a xanthogenate group at an chain end thereof. The reaction yield was 95 mol % according to the nuclear magnetic resonance spectral analysis.

Embodiment 7

The 0.001 mol RAFT material (5.2 g) prepared in Embodiment 6 was put in a 250 mL round flask reactor in a nitrogen atmosphere, and dissolved in dimethylformamide (DMF) (100 mL). Then, after AIBN radical initiator ($1.0 \times 10^{-4}$ mol) was poured into the reactor, the temperature was increased up to 90° C., and N-phenylmaleimide (2 g) dissolved in dimethylformamide (50 mL) was poured into the reactor at a nitrogen atmosphere through a syringe. After a 24-hour reaction, the temperature was decreased to the room temperature to terminate the reaction, and a block co-polymer of 7.0 g was obtained from a precipitation in dimethyl ether.

Embodiment 8

The polyethylence oxide macro initiator (2 g, $M_n$=5,100 g/mol) prepared in Embodiment 3 was put in a 500 mL round flask reactor. Then, after tetrahydrofuran (100 mL) was poured into and thoroughly dissolved under nitrogen atmosphere, potassium ethyl xanthogenate (96%, 0.3 g) dissolved in tetrahydrofuran was poured into the reactor. The reaction was processed at 45° C. in a nitrogen atmosphere during 24 hours, to thereby synthesize a reversible addition fragmentation chain transfer (RAFT) material ($M_n$=5,200 g/mol) having a xanthogenate group at an chain end thereof. The reaction yield was 95 mol % according to the nuclear magnetic resonance spectral analysis and the weight of the RAFT material was 2.1 g.

Embodiment 9

The RAFT material (2.0 g) prepared in Embodiment 8 was used and N-phenylmaleimide (2 g) was poured into the reactor in a nitrogen atmosphere under the same conditions as those in embodiment 7, and the RAFT polymerization was performed, to thereby produce polyethylene oxide-poly (N-phenylmaleimide) block co-polymer (3.8 g). The polymerization yield was 90 mol % according to the nuclear magnetic resonance spectral analysis.

Embodiment 10

The block co-polymer (2.0 g) prepared in Embodiment 7 was used and mono-hydrated hydrazine (0.03 mol) dissolved in dimethylformamide (20 mL) was poured into the reactor in a nitrogen atmosphere through a syringe. The reaction was processed at a room temperature during 24 hours. The reaction products were precipitated in excessive dimethyl ether, so that yellow powder (1.5 g) was obtained. The molecular weight thereof was 6,200 g/mol according to the nuclear magnetic resonance spectral analysis.

Embodiment 11

The block co-polymer (2 g) prepared in Embodiment 9 reacted under the same conditions as those in Embodiment 10, so that a reaction product of 1.6 g was obtained. The molecular weight of the reaction product was 6,200 g/mol according to the nuclear magnetic resonance analysis.

Embodiment 12

The 0.001 mol RAFT material (5.2 g) prepared in Embodiment 6 was put in a 250 mL round flask reactor in a nitrogen atmosphere, and dissolved in dimethylformamide (100 mL). Then, after AIBN radical initiator ($1.0 \times 10^{-4}$ mol) was poured into the reactor, the temperature was increased up to 90° C., and 1-vinylimidazole (2 g) dissolved in DMF (20 mL) was poured into the reactor through a syringe. After a 24-hour reaction, N-phenylmaleimide (2 g)/DMF (20 mL) was also poured into the reactor through a syringe. The reaction was performed during 24 hours, to thereby synthesize triblock co-polymer (8.5 g). The molecular weight of the product was 9,000 g/mol according to the nuclear magnetic resonance spectral analysis.

Embodiment 13

The 0.001 mol RAFT material ($M_n$=5,200) prepared in Embodiment 8 reacted under the same condition as those in Embodiment 12, to thereby synthesize triblock co-polymer (8.6 g). The molecular weight of the product was 9,200 g/mol according to nuclear magnetic resonance spectral analysis.

Embodiment 14

The 0.001 mol RAFT material (5.2 g) prepared in Embodiment 6 was put in a 250 mL round flask reactor in a nitrogen atmosphere, and dissolved in DMF (100 mL). Then, after AIBN radical initiator ($1.0 \times 10^{-4}$ mol) was poured into the reactor, the temperature was increased up to 90° C., and 1-vinylimidazole (2 g) and N-phenylmaleimide (2 g) dissolved in DMF (20 mL) was poured into the reactor through a syringe. The reaction was performed during 24 hours, to thereby synthesize polyethylene oxide block co-polymer (8.4 g). The molecular weight of the product was 8,800 g/mol according to the nuclear magnetic resonance spectral analysis.

Embodiment 15

The block co-polymer (5.0 g) prepared in Embodiment 12 was dissolved with DMF (100 mL) in a 250 mL round flask reactor, and 0.017 mol hydrated hydrazine (3.79 g) dissolved in DMF (20 mL) was added into the reactor in a nitrogen atmosphere through a syringe. The reaction was performed at a room temperature during 24 hours. Then, the reaction product was precipitated in excessive dimethyl ether, so that co-polymer (4.0 g) was obtained. The molecular weight thereof was 8,200 g/mol according to the nuclear magnetic resonance spectral analysis.

Embodiment 16

The co-polymer prepared in Embodiment 13 reacted under the same conditions as those in Embodiment 15, to thereby synthesize block co-polymer (4.1 g). The molecular weight thereof was 8,400 g/mol according to the nuclear magnetic spectral analysis.

Embodiment 17

The polymer (5.0 g) prepared in Embodiment 14 reacted under the same condition as those on Embodiment 15, to thereby synthesize a product (4.0 g). The molecular weight thereof was 8,200 g/mol according to the nuclear magnetic spectral analysis.

Embodiment 18

The 0.001 mol RAFT material (5.2 g) prepared in Embodiment 6 was put in a 250 mL round flask reactor in a nitrogen atmosphere, and dissolved in dimethylformamide (100 mL). Then, after AIBN radical initiator ($1.0 \times 10^{-4}$ mol) was poured into the reactor, the temperature was increased up to 90° C., and N-vinylpyrrolidone (2 g) dissolved in DMF (20 mL) was poured into the reactor through a syringe. After a 24-hour reaction, N-phenylmaleimide (2 g)/DMF (20 mL) was additionally poured into the reactor through a syringe. The reaction was performed during 24 hours, to thereby synthesize triblock co-polymer (8.0 g). The molecular weight of the product was 8,300 g/mol according to the nuclear magnetic resonance spectral analysis.

Embodiment 19

The 0.001 mol RAFT material ($M_n$=5,200) prepared in Embodiment 8 reacted under the same condition as those in Embodiment 18, to thereby synthesize triblock co-polymer (8.1 g). The molecular weight of the product was 8,200 g/mol according to the nuclear magnetic resonance spectral analysis.

Embodiment 20

The 0.001 mol RAFT material (5.2 g) prepared in Embodiment 6 was put in a 250 mL round flask reactor in a nitrogen atmosphere, and dissolved in dimethylformamide (100 mL). Then, after AIBN radical initiator ($1.0 \times 10^{-4}$ mol) was poured into the reactor, the temperature was increased up to 90° C., and N-vinylpyrrolidone (2 g) and N-phenylmaleimide (2 g) dissolved in DMF (20 mL) was poured into the reactor through a syringe. The reaction was performed during 24 hours, to thereby synthesize polyethylene oxide block co-polymer (8.0 g). The molecular weight of the product was 8,100 g/mol according to the nuclear magnetic resonance spectral analysis.

Embodiment 21

The block co-polymer (5.0 g) prepared in Embodiment 18 was dissolved with DMF (100 mL) in a 250 mL round flask reactor, and 0.017 mol hydrated hydrazine (3.79 g) dissolved in DMF (20 mL) was added into the reactor in a nitrogen atmosphere through a syringe. The reaction was performed at a room temperature during 24 hours. Then, the reaction product was precipitated in excessive dimethyl ether, so that co-polymer (3.9 g) was obtained. The molecular weight thereof was 8,100 g/mol according to the nuclear magnetic resonance spectral analysis.

Embodiment 22

The polymer (5.0 g) prepared in Embodiment 19 reacted under the same condition as those on Embodiment 21, to thereby synthesize block co-polymer (4.1 g). The molecular weight thereof was 8,000 g/mol according to the nuclear magnetic spectral analysis.

Embodiment 23

The polymer (5.0 g) prepared in Embodiment 20 reacted under the same condition as those on Embodiment 21, to thereby synthesize block co-polymer (4.0 g). The molecular weight thereof was 7,900 g/mol according to the nuclear magnetic spectral analysis.

Embodiment 24

The 0.001 mol RAFT material (5.2 g) prepared in Embodiment 8 was put in a 250 mL round flask reactor in a nitrogen atmosphere, and dissolved in DMF (100 mL). Then, after AIBN radical initiator ($1.0 \times 10^{-4}$ mol) was poured into the reactor, the temperature was increased up to 90° C., and sulfadimethoxinyl methacrylamide (2 g) dissolved in DMF (20 mL) was poured into the reactor through a syringe. After a 24-hour reaction, N-phenylmaleimide (2 g) dissolved in DMF (20 mL) was poured into the reactor through a syringe. The reaction was performed during 24 hours. Then, the reaction product was precipitated in excessive dimethyl ether, so that polyethylene oxide block co-polymer (8.8 g) was synthesized. The molecular weight thereof was 9,000 g/mol according to the nuclear magnetic resonance spectral analysis.

Embodiment 25

The 0.001 mol RAFT material prepared in Embodiment 8 reacted under the same conditions as those on Embodiment 24, to thereby synthesize block co-polymer (8.6 g). The molecular weight thereof was 8,900 g/mol according to the nuclear magnetic spectral analysis.

Embodiment 26

Under the same materials and conditions as those on Embodiment 24, an imide monomer and an amide monomer were mixed, and the mixture dissolved in DMF (40 mL) was poured into a reactor through a syringe. Thereby, co-polymer (8.8 g) was synthesized through a random co-polymerization. The molecular weight thereof was 8,800 g/mol according to the nuclear magnetic spectral analysis.

Embodiment 27

The polymer (5.0 g) prepared in Embodiment 24 reacted under the same conditions as those on Embodiment 15, to thereby synthesize co-polymer (4.2 g). The molecular weight thereof was 8,200 g/mol according to the nuclear magnetic spectral analysis.

Embodiment 28

The block co-polymer (5.0 g) prepared in Embodiment 25 reacted under the same conditions as those on Embodiment 15, to thereby synthesize co-polymer (4.3 g). The molecular weight thereof was 8,300 g/mol according to the nuclear magnetic spectral analysis.

Embodiment 29

The random co-polymer (5.0 g) prepared in Embodiment 26 reacted under the same conditions as those on Embodiment 15, to thereby synthesize co-polymer (4.2 g). The molecular weight thereof was 8,100 g/mol according to the nuclear magnetic spectral analysis.

Embodiment 30

The 0.001 mol RAFT material (5.2 g) prepared in Embodiment 6 was put in a 250 mL round flask reactor in a nitrogen atmosphere, and dissolved in DMF (100 mL). Then, after AIBN radical initiator ($1.0 \times 10^{-4}$ mol) was poured into the reactor, the temperature was increased up to 90° C., and N-vinylpyrrolidone (2 g) dissolved in DMF (20 mL) was poured into the reactor. After a 24-hour reaction, N-phenylmaleimide (2 g) dissolved in DMF (20 mL) was additionally poured into the reactor through a syringe. The reaction was performed during 24 hours, to thereby synthesize polyethylene oxide block co-polymer (8.3 g). The molecular weight of the product was 8,700 g/mol according to the nuclear magnetic resonance spectral analysis.

Embodiment 31

The 0.001 mol RAFT material (5.2 g) prepared in Embodiment 6 was put in a 250 mL round flask reactor in a nitrogen atmosphere, and dissolved in DMF (100 mL). Then, after AIBN radical initiator ($1.0 \times 10^{-4}$ mol) was poured into the reactor, the temperature was increased up to 90° C., and N-isopropyl acrylamide (2 g) dissolved in DMF (20 mL) was poured into the reactor. After a 24-hour reaction, N-phenylmaleimide (2 g) dissolved in DMF (20 mL) was additionally poured into the reactor through a syringe. The reaction was performed during 24 hours, to thereby synthesize polyethylene oxide block co-polymer (8.3 g). The molecular weight of the product was 8,700 g/mol according to the nuclear magnetic spectral analysis.

Embodiment 32

The 0.001 mol RAFT material (5.2 g) prepared in Embodiment 6 was put in a 250 mL round flask reactor in a nitrogen atmosphere, and dissolved in DMF (100 mL). Then, after AIBN radical initiator ($1.0 \times 10^{-4}$ mol) was poured into the reactor, the temperature was increased up to 90° C., and N-vinylimidazole (2 g) dissolved in DMF (20 mL) was poured into the reactor. After a 24-hour reaction, sulfon amide methacrylamide monomer (2 g) dissolved in DMF (20 mL) was additionally poured into the reactor through a syringe, and was polymerized during 24 hours. After the polymerization reaction, N-phenylmaleimide (2 g) dissolved in DMF (20 mL) was poured into the reactor through a syringe, and reacted during 24 hours, to thereby synthesize polyethylene oxide block co-polymer (10 g). The molecular weight of the product was 11,200 g/mol according to the nuclear magnetic resonance spectral analysis.

Embodiment 33

The block co-polymer (5.0 g) prepared in Embodiment 30 was dissolved with DMF (100 mL) in a 250 mL round flask reactor, and 0.017 mol hydrated hydrazine (3.79 g) dissolved in DMF (20 mL) was added into the reactor in a nitrogen atmosphere through a syringe. The reaction was performed at a room temperature during 24 hours. Then, the reaction product was precipitated in excessive dimethyl ether, so that co-polymer (4.0 g) was obtained. The molecular weight thereof was 8,100 g/mol according to the nuclear magnetic resonance spectral analysis.

Embodiment 34

The block co-polymer (5.0 g) prepared in Embodiment 31 was dissolved with DMF (100 mL) in a 250 mL round flask reactor, and 0.017 mol hydrated hydrazine (3.79 g) dissolved in DMF (20 mL) was added into the reactor in a nitrogen atmosphere through a syringe. The reaction was performed at a room temperature during 24 hours. Then, the reaction product was precipitated in excessive dimethyl ether, so that co-polymer (3.9 g) was obtained. The molecular weight thereof was 7,900 g/mol according to the nuclear magnetic resonance spectral analysis.

Embodiment 35

The block co-polymer (5.0 g) prepared in Embodiment 32 was dissolved with DMF (100 mL) in a 250 mL round flask reactor, and 0.017 mol hydrated hydrazine (3.79 g) dissolved in DMF (20 mL) was added into the reactor in a nitrogen atmosphere through a syringe. The reaction was performed at a room temperature during 24 hours. Then, the reaction product was precipitated in excessive dimethyl ether, so that co-polymer (4.1 g) was obtained. The molecular weight thereof was 10,200 g/mol according to the nuclear magnetic resonance spectral analysis.

While the present invention has been shown and described in connection with the exemplary embodiments, it will be apparent to those skilled in the art that modifications and variations can be made without departing from the spirit and scope of the invention as defined by the appended claims.

The invention claimed is:
1. A polyethylene oxide co-polymer comprising repeating units expressed by the following Chemical Formula 1 and repeating units expressed by the following Chemical Formula 2, wherein the polyethylene oxide co-polymer further includes repeating units of at least one of the structures expressed by the following Chemical Formulas 3 through 6:

[Chemical Formula 1]

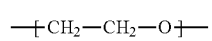

[Chemical Formula 2]

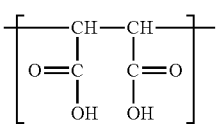

[Chemical Formula 3]

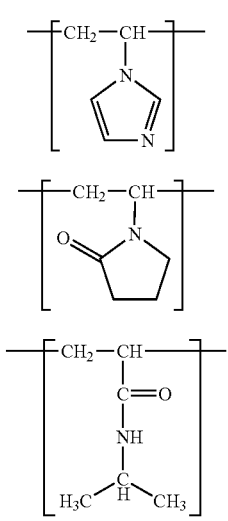

[Chemical Formula 4]

[Chemical Formula 5]

[Chemical Formula 6]

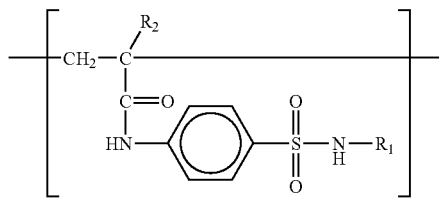

where $R_1$ is phenyl, oxazole, acetyl, methizole, dimethoxine, diazine, methoxypryidazine, methazine, isomidine, or pyridine, and $R_2$ is hydrogen or methyl.

2. The polyethylene oxide co-polymer of claim 1, wherein the compound includes at least one of repeating units expressed by the following Chemical Formulas 8 through 16:

[Chemical Formula 8]

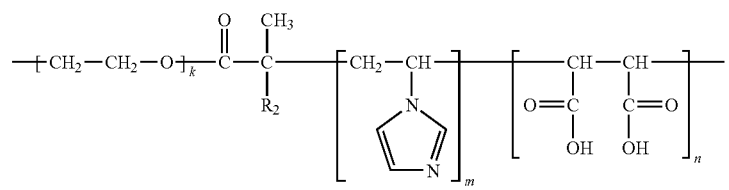

[Chemical Formula 9]

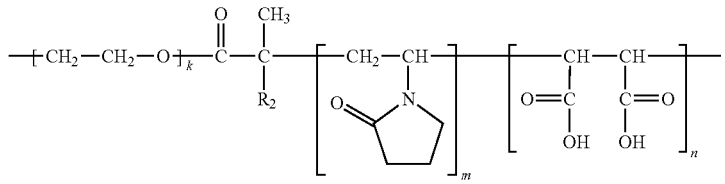

[Chemical Formula 10]

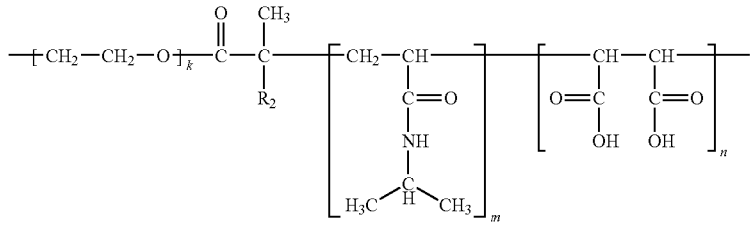

[Chemical Formula 11]

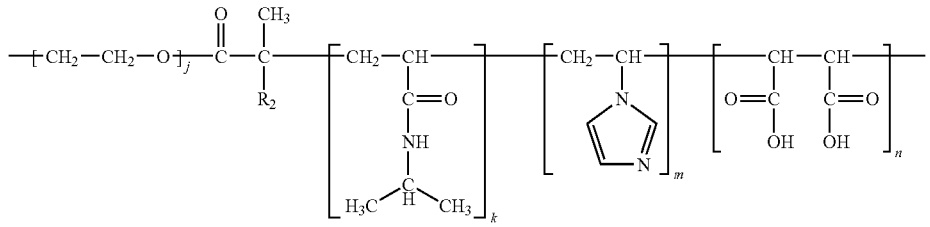

[Chemical Formula 12]

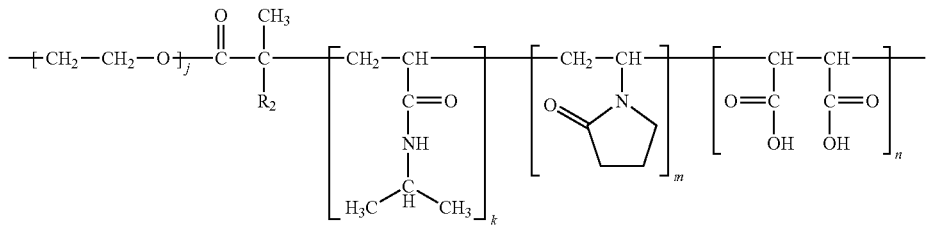

-continued
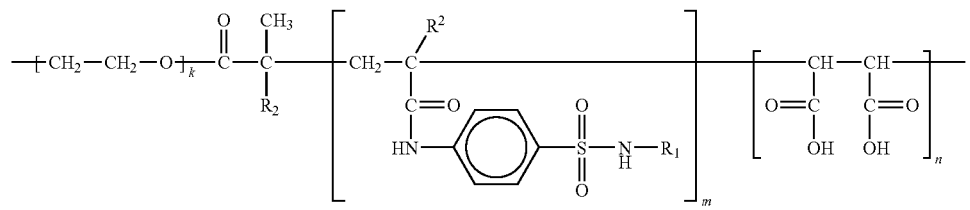
[Chemical Formula 13]
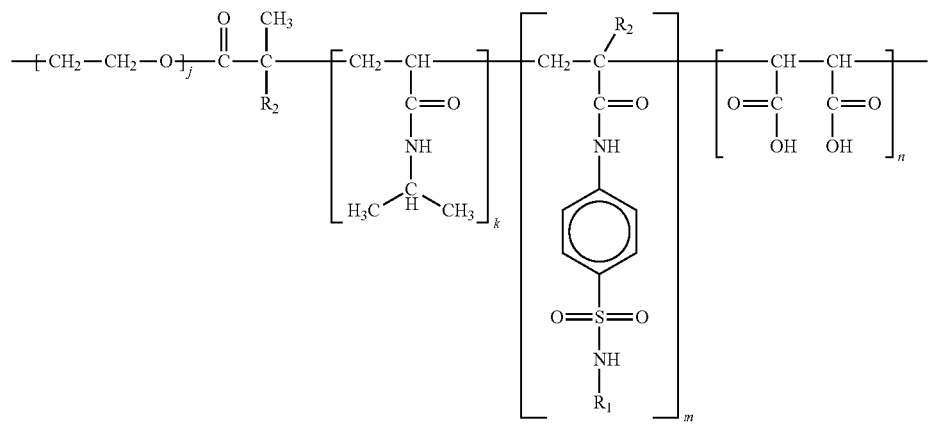
[Chemical Formula 14]
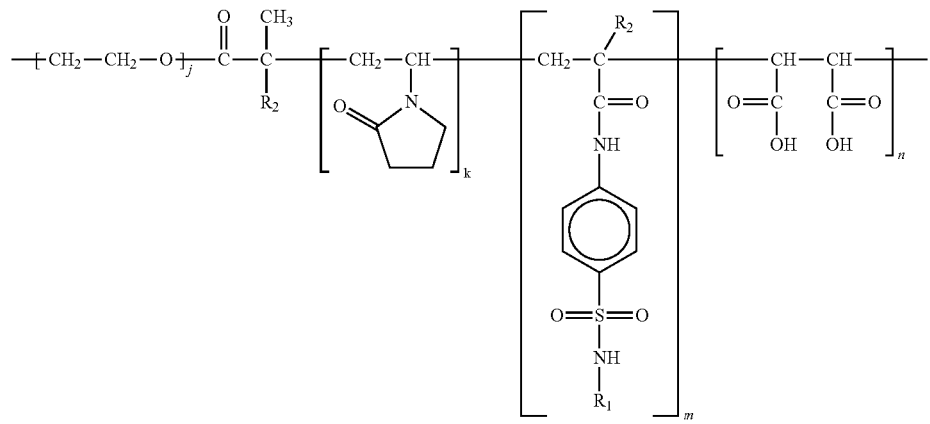
[Chemical Formula 15]
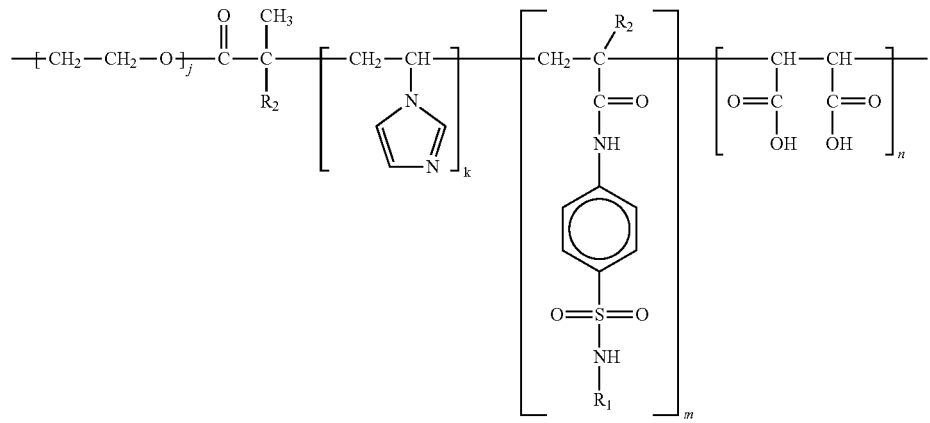
[Chemical Formula 16]
where $R_1$ is phenyl, oxazole, acetyl, methizole, dimethoxine, diazine, methoxypryidazine, methazine, isomidine, or pyridine, $R_2$ is hydrogen or methyl, m is an integer of from 5 to 500, n is an integer of from 3 to 500, and j and k are integers of from 20 to 500.
* * * * *